Patented Feb. 16, 1937

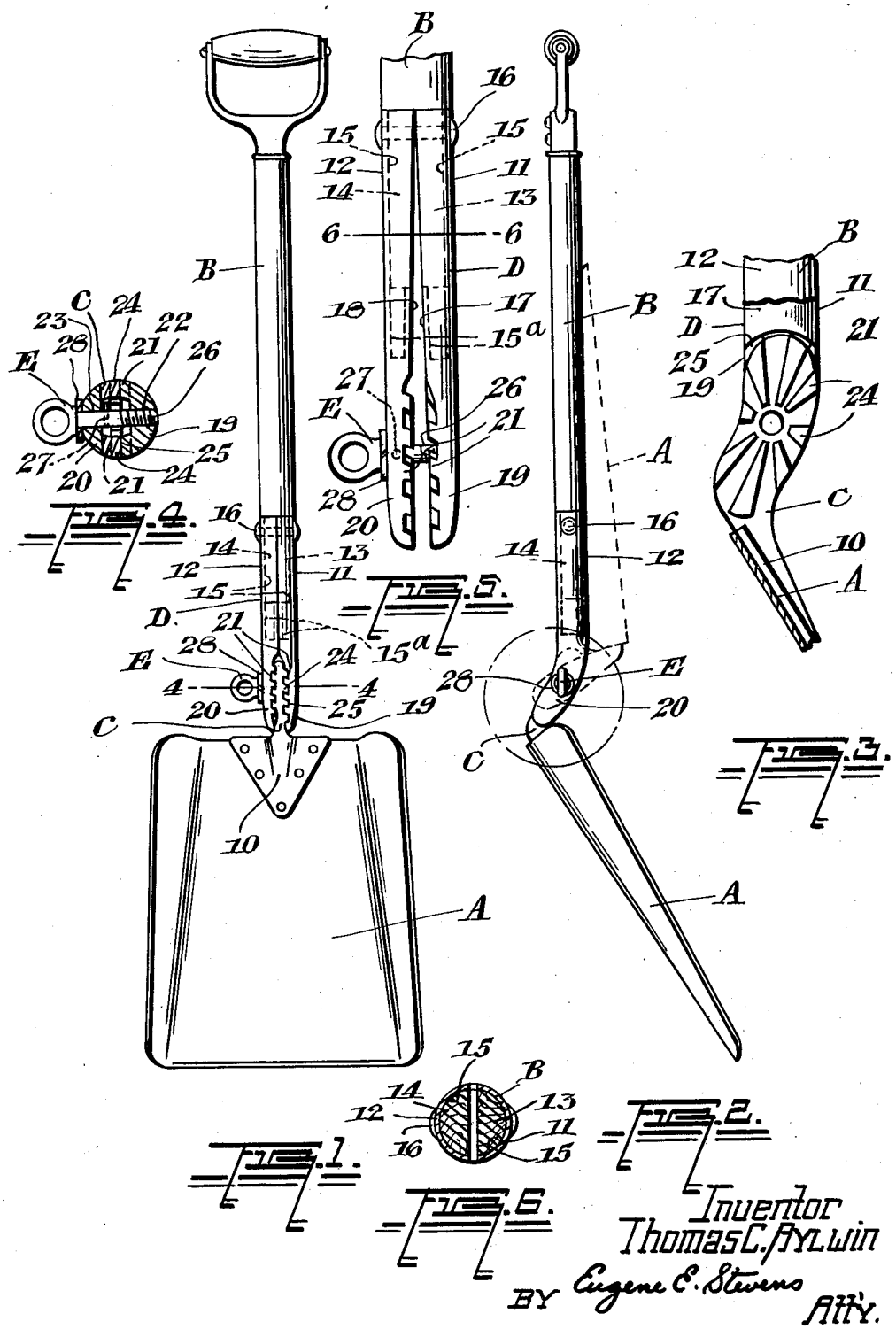

2,070,555

UNITED STATES PATENT OFFICE 2,070,555

FOLDING SHOVEL

Thomas Cushing Aylwin, Oshawa, Ontario, Canada

Application May 18, 1934, Serial No. 726,368
In Canada April 10, 1934

2 Claims. (Cl. 306—17)

This invention relates to folding shovels and an object of the invention is to provide a simple and durable shovel construction wherein the handle may be readily folded over the blade of the shovel or moved from a folded position to the normal position of a shovel handle and locked rigidly in this latter position.

A further object of the invention is to provide a durable and practical connecting structure between the handle and the blade.

A still further object of the invention is to provide a connecting structure of this character wherein, if desired, the shovel blade may be disposed at different angles to the handle.

A further object of the invention is to provide generally an arrangement whereby a shovel can be collapsed and easily carried in a camping outfit or readily placed in a restricted space such as beneath the seat of a motor car, etc.

With these and other objects in view the invention consists essentially in a shovel blade and handle, the handle being formed with a practical type of shank including gripping means and the shovel blade being formed with a projecting part to be engaged by the gripping means, with the provision of a locking member for holding the gripping means and projecting part of the shovel blade in rigid engagement, the locking means being readily releasable so that the handle may be folded over the blade and substantially lie thereon, as more fully described in the following specification and illustrated in the accompanying drawing.

In the drawing, Figure 1 is a front elevation of a shovel constructed according to the present invention.

Figure 2 is a side elevation of Figure 1.

Figure 3 is an enlarged fragmentary view of that portion of the shovel encircled in Figure 2 with part of the shank broken away to illustrate the gripping construction of part of the projection on the shovel.

Figure 4 is an enlarged section taken on the line 4—4 of Figure 1.

Figure 5 is an enlarged fragmentary view of the lower end of the handle illustrating the two portions of the shank split apart from one another.

Figure 6 is a section taken on the line 6—6 of Figure 5.

Referring more particularly to the drawing, A indicates the shovel blade and B indicates the handle. According to the present invention the shovel blade is provided with a projection C which is secured to the blade by means of a suitable tongue or bracket member 10. The projection C is designed to co-operate with the shank D of the handle so that the handle may be locked rigidly on the shovel blade to provide a shovel of conventional form. The shank D is formed by two members 11 and 12 which are designed normally to lie abutting one another but are separable one from the other as will be apparent hereafter.

According to the preferred construction the lower end of the handle which receives the shank D is split to form two arms 13 and 14 (see Figure 5) to engage with the two parts 11 and 12 of the shank. To this end the parts 11 and 12 are recessed or socketed as at 15 to receive the arms 13 and 14, the socketed portion of each part preferably consisting of a socket walled in on all sides and one end, as at 15a, to receive the extreme ends of the arms 13 and 14 and continuations of said socket open on one side and end to receive the upper portion of these arms. When the latter are received in these sockets the shank is attached by means of a rivet 16 which passes through the shank and handle and in addition to forming a securing means for the shank functions as a reinforcing member to the split portion of the handle avoiding undue strain being placed thereon which might result in a splitting of the handle.

Below the socketed portion the members 11 and 12 are preferably cast solid and their opposed faces 17 and 18 are formed flat so that when they meet, as shown in Figure 1, they will jointly provide a substantially cylindrical socketed shank. The free ends of the members 11 and 12, as clearly shown in Figures 2 and 3, terminate in angularly disposed projections 19 and 20, the opposed surfaces 17 and 18 in this area being formed with gripping means which might take various forms. Preferably the gripping means take the form of a plurality of radially disposed ribs 21 diverging from a centre which is formed by the circular orifices 22 and 23 provided in each member which is designed to receive the securing member E.

The projection C on the shovel blade is shaped correspondingly to the projecting ends 19 and 20 of the shank and is provided with a plurality of radially disposed ribs 24 which are designed to enter the channels 25 formed between the ribs 21 on the shank so that when the projecting ends of the shank are brought into engagement with the projection C the ribs 21 and 24 are interlocked and form a very rigid joint. Furthermore, due to the shape of the projection C and the ends 19 and 20 of the shank which are of an elongated character, the series of relatively long ribs provided on both members will provide for a substantially reinforced joint. The projection C is also formed with an orifice which is aligned with the orifices 22 and 23 so that the locking member E may correspondingly project through all members.

On referring to Figure 4 it will be seen that the orifice 22 formed in the end 19 of the shank is screw-threaded to receive a screw-threaded end 26 of the locking member E whereas the orifice 23 of the end 20 of the shank is smooth-faced and receives the smooth-faced part of the locking member. Moreover, by inserting the pin 27 through the locking member on the inside of the end 20, the locking member is rotatably secured in the orifice 23 so that on rotating the locking member it will be turned freely in the orifice 23 while the screw-threaded end working in the screw-threaded orifice 22 will serve to move the ends 19 and 20 towards each other or positively move them apart. Thus, when the shank is adjusted to the proper angle on the projection C, the ends 19 and 20 of the shank are immediately moved into bearing engagement with the projection when the locking member is turned in a clockwise direction whereas, when it is desired to release the handle, the ends are automatically moved apart when the locking member is turned in a counterclockwise direction. Accordingly there is no impediment to movement of the handle once the locking member has been released since the ends 19 and 20 are positively moved out from the projection to avoid any contact between the ribs which would impede the easy collapsing of the shovel and this also avoids the necessity of a further operation to spread the ends 19 and 20 apart sufficiently to permit collapse, which would otherwise be necessary if some other form of securing means were employed that would not automatically spread the ends when it was being released.

The lock washer 28 is mounted on the locking member E between a shoulder thereon and the outside surface of the end 20 so that when the locking member is turned to hold the ends in rigid engagement with the projection C the locking member is placed under the influence of the spring pressure of the lock washer, thus holding it against loosening when the shovel is being used.

On referring to Figure 2 it will be apparent that the ends 19 and 20 of the shank are offset at an angle and that the projection C extends from the shovel blade at a corresponding angle so that when the shovel handle is folded on the blade it will lie substantially flat along the plate. This is illustrated in Figure 2, the blade being shown in dotted lines to illustrate the shovel in folded position.

The gripping structure might, of course, take another form, merely providing one or two ribs or their equivalent to form a rigid joint but it will be realized that in providing a plurality of radially disposed ribs on the appropriate members the shovel blade may be adjusted and locked on the handle in folded or unfolded position as well as at different angles if desired.

It should be apparent in the foregoing that I have provided a folding shovel construction which may be readily operated to place it in folded position or to return it from folded position to a rigidly connected normal form. Furthermore, having regard to the type of joint employed and the construction of the shank, it is apparent that a very durable form of folding structure is provided. In this connection it is pointed out that the socket 15 in the shank to receive the arms 13 and 14 of the shovel handle might further be provided with a pocket or socket walled in on all sides except one into which the free ends of the arms 13 and 14 might be projected instead of abutting the solid end of the socket 15. Furthermore the shank might possibly be mounted on the shovel handle without employing the split type of shovel handle while it would be also possible to use a different type of locking construction.

Various modifications may be made in this invention without departing from the spirit thereof or the scope of the claims and therefore the exact forms shown are to be taken as illustrative only and not in a limiting sense, and it is desired that only such limitations shall be placed thereon as are disclosed in the prior art or are set forth in the accompanying claims.

I claim:—

1. In a folding shovel having a shovel blade, a handle mountable on said blade, having one end split to form arms, and a shank formed in two corresponding socketed members, the ends of the handle fitting into the sockets of the members, and means for securing said members on said handle, said members being formed with gripping means to engage a co-operating part on the blade, and means for locking said gripping means in rigid engagement with said part on the blade.

2. The device as claimed in claim 1 in which the shank is secured on the handle by means of a rivet, said rivet also forming a reinforcing member for the split portion of the handle.

THOMAS CUSHING AYLWIN.